Nov. 21, 1967   J. M. SNEED   3,353,282
TEACHING APPARATUS

Filed May 3, 1965   2 Sheets-Sheet 1

Inventor
JOHN M. SNEED
By
Attorney

Nov. 21, 1967     J. M. SNEED     3,353,282
TEACHING APPARATUS

Filed May 3, 1965     2 Sheets-Sheet 2

Inventor
JOHN M. SNEED
By
Attorney

United States Patent Office 3,353,282
Patented Nov. 21, 1967

3,353,282
TEACHING APPARATUS
John M. Sneed, Clayton, Mo.
(4908 Delmar Blvd., St. Louis, Mo. 63108)
Filed May 3, 1965, Ser. No. 452,788
4 Claims. (Cl. 35—29)

ABSTRACT OF THE DISCLOSURE

A designated performing area, a reflecting surface adjacent the performing area and positioned to reflect an image of a student in the area, calibration marks on the reflecting surface, a projection screen positioned to be observed by the student within the performing area, with calibration marks on the screen in direct correspondence to those on the reflective surface, and a projector on the side of the projection screen away from the student and arranged to project the image of a teacher on the screen. The calibration marks are so positioned and arranged as to bear a significant arrangement to the acts to be performed.

Particularly in the teaching of golf, the calibration marks are so positioned and arranged that the angularity of a golf club held by the student, relative to a reference point on the student, can immediately be observed and determined, and an elongated calibration mark is provided in the playing area defining the proper path of the head of the golf club as it is swung through the impact point.

Background of the invention

This invention relates to apparatus for teaching manual skills which require coordination in time and position of parts of the body and in which the arms or legs of the persons exercising these skills are at some time during this exercise at positions of gross angularity in relation to the trunk of the body, or other parts of the body in relation to one another.

Examples of such manual skills are found in many sports such as golf, tennis, bowling, boxing, basketball, baseball, football and judo, in social activities such as dancing, acting, public speaking, and various social graces, such as being seated properly, and serving and eating food correctly, and in industrial operations, such as certain assembly line work and freight handling.

Several systems have been proposed for the teaching of manual skills of the type described. See, for example, U.S. Patents to Rose, et al. No. 2,939,224, and Roberston, No. 2,494,000. These systems, while useful, have certain disadvantages. Rose et al. necessarily requires a time lapse for developing of the photographs employed, and both Rose et al. and Robertson provide no means for establishing measurable definition between the movements of the teacher and of the student.

One of the objects of this invention is to provide means for teaching manual skills in which some part or parts of the body assume momentary or prolonged positions of gross angularity with relation to other parts of the body, by which discrepancies between the positions or movements of a student and those of a teacher can immediately be measured.

Another object of this invention is to provide such means by which a trace of a student's movements of his extremities or of implements he employs may be produced on a surface which the student can observe for a short length of time after the movement has been completed.

Other objects will become apparent to those skilled in the art in the light of the following description and accompanying drawings.

Summary of the invention

In accordance with this invention generally stated, means is provided for teaching manual skills in which some parts of the body, usually one of the extremities, assumes momentary or prolonged positions of gross angularity with relation to another part of the body, which means includes a combination of at least one calibrated surface, preferably reflective, upon which a student's movements are reflected or traced, and observed by the student, and at least one similarly calibrated surface upon which a teacher's movements are projected. The teachers movements may be projected by means of a motion picture projector, a "still" projector, by reflection from a live instructor or by any other suitable means. The surface upon which the student's movements are observed may be provided with a phosphorescent coating or backing. When so provided, the coating or backing records a trail of light left by a light carried by the part of the student to be observed or by some implement used by the student, for a period of time sufficient for measurements to be taken or observed after the movement has been completed. This trail of light disappears quickly enough so that the same operation may be repeated or another commenced without delay.

The calibrations of the two surfaces, teacher's and student's, are of the greatest importance. In order that they may be properly utilized, means are provided for ensuring the proper position of the student and surfaces relative to one another, and for ensuring a proper reference point, line or area from which measurement is made.

The advantages of the present invention as compared with the methods and means now in use are many. The developing time required by purely photographic comparisons is eliminated. The calibrations of this invention give a standard of comparison totally lacking in present systems. Furthermore, the invention permits verbel instruction to be given simultaneously with the demonstrated physical action. The present invention can be used also as an adjunct of present day methods without sacrificing any of the advantages of the present invention while adding greatly to the efficiency of the instructions.

Description of the preferred embodiments

Figure 1:
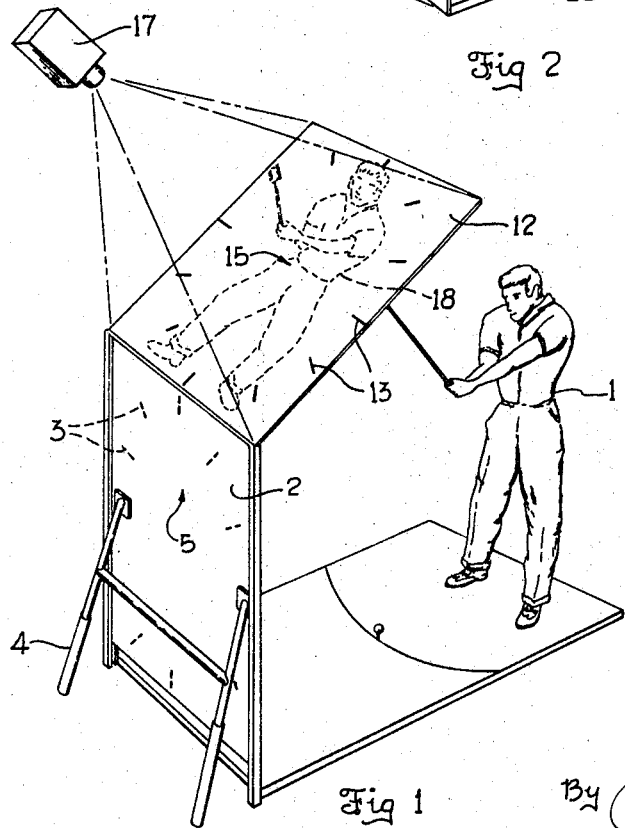
FIGURE 1 is a view in perspective of one illustrative embodiment of apparatus of this invention, applied to the teaching of golf.

Referring now to FIGURE 1 for one illustrative example of the invention, reference numeral 1 indicates a golf student standing before a mirror 2. The mirror 2 has calibrations 3 much in the manner of a clock face. The mirror 2 is equipped with adjusting means 4 by which it can be adjusted vertically with respect to the student, in order that a reference point 5 on the mirror can be aligned with a particular part of the body of the student. Horizontal alignment can of course be accomplished in this embodiment by movement of the student laterally of the mirror.

At a location removed from the mirror but within the line of vision of the student, in this embodiment, above the mirror 2, is a screen 12, from behind and onto which a projector 17 throws an image 18 of an instructor.

In this embodiment, the projector 17 is a motion picture projector, so arranged as to repeat indefinitely a sequence showing a single type of golfing stroke, e.g. a drive. The screen is also calibrated as indicated at 13, in exact correspondence to the calibrations of the mirror, and a reference point 15 is provided with respect to which the instructor is positioned in the same way as the student is to position himself with respect to the reference point 5 on the mirror.

The projector may be of the rewind type, rewinding after each run-through of a sequence, so as to give the student an opportunity to recover the proper initial position. It can also be made progressively to speed up upon successive reruns, to a predetermined final speed.

The student can either watch the screen until he has fixed the proper position and motion in his mind and then attempt to emulate them, or he can go through the motions simultaneously with the instructor. It can be seen, however, that because the essential movements of the golfer are in an arc, the calibrations will enable the student to fix exactly the proper positions of his club and body at, and from, the top of the backswing to the end of his follow-through.

In the preferred embodiment, the mirror is coated with a phosphorescent material and the club head is provided with a small but powerful light source so that a faint but distinguishable streak of phosphorescent light will appear momentarily on the mirror, enabling the student better to compare his stroke, against the calibrations, with that of the instructor.

Figure 2:
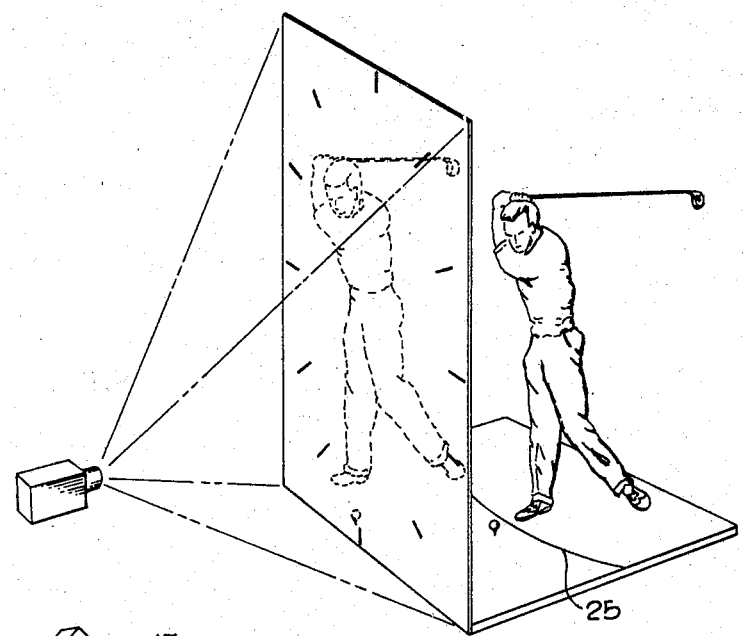
FIGURE 2 is a view in perspective of another illustrative embodiment of apparatus of this invention also applied to the teaching of golf.

In the embodiment shown in FIGURE 2, the screen is coincident with the mirror, as in Robertson, No. 2,494,000, but the phosphorescence, calibrations and reference point enable the student to follow the instructor with greater care and accuracy than is possible in the Robertson device.

In this embodiment, a phosphorescent area is provided directly beneath the ball, upon which area a calibrated mark 25 is provided for guidance. A light 23 is provided directed directly downwardly from the underside of a head 22 of a golf club 21. The mark 25 describes the proper path of the club head with respect to the ball, and the momentary streak of light described by the light in the club head of the club used by the student will readily be seen either to coincide or not to coincide with the mark. A similar streak may be projected onto the screen, so that the motion required will also be evident to the student.

Figure 4:
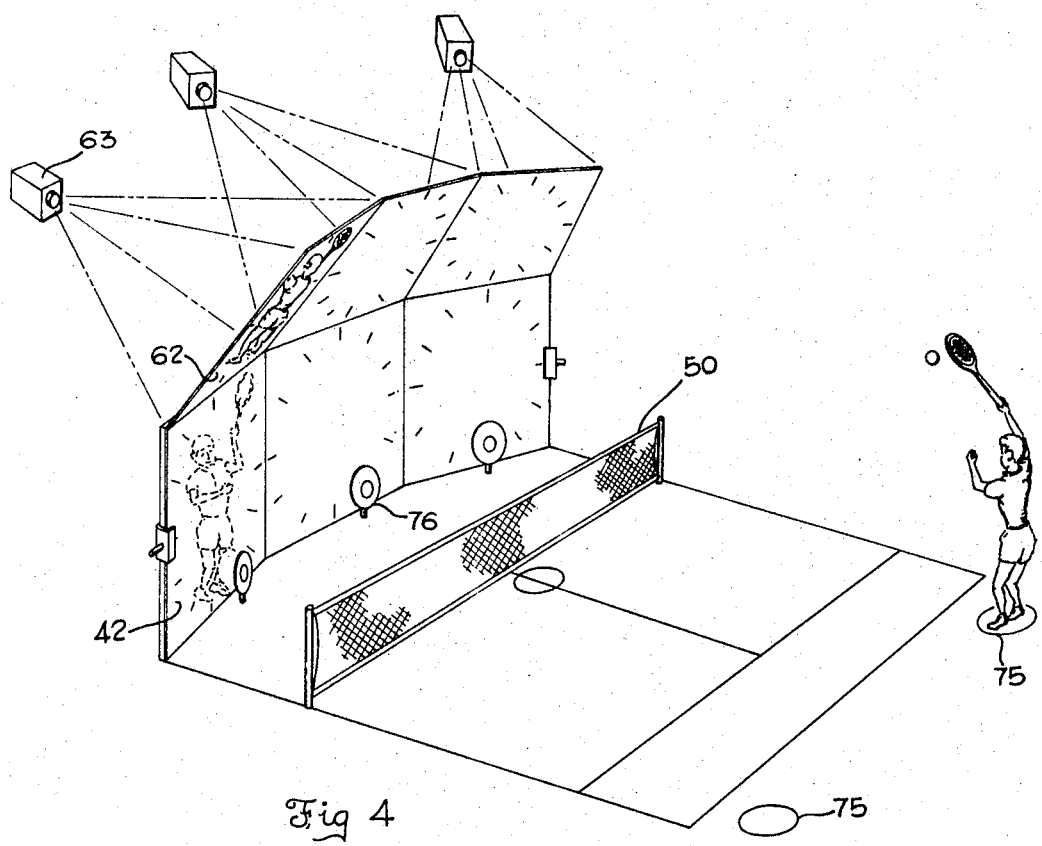
FIGURE 4 is a view in perspective of another illustrative embodiment of apparatus of this invention, applied to the teaching of tennis.
Figure 3:
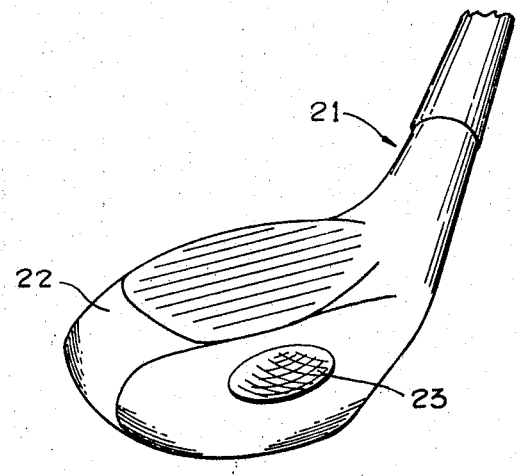
FIGURE 3 is a view in perspective, partly broken away, showing a golf club head with a light in it, being a part of apparatus of the embodiment shown in FIGURE 2.

In the embodiment shown in FIGURE 4, a tennis instruction device is provided, wherein a mirror 42 is provided on the far side of a net 50, and a screen 62 is provided, both of which are equipped with inturned wing sections so as to reflect and be visible to a student in the diagonally opposite court. The screen is too wide and of a wrong shape to permit the practical use of a single fixed projector. In the embodiment shown, a projector 63 is arranged to pivot so that for instruction in the service, it is directed first at one side of the court (diagonally opposite the server-student), then the other. For instruction in the volley, both forehand and backhand, the projector is directed toward the center of the screen. As in the other embodiments shown in FIGURES 1 and 2, the screen and mirror are provided with calibrations, and with reference points. However, in this embodiment, the reference points include areas 75 upon which the student stands. In addition, targets 76 are provided on the far side of the net from the student, so as to give the student another reference point, this one of delivery.

In all of the embodiments of the invention, the screen may be differently placed with respect to the student, so long as it is placed within easy observation of the student.

In all of the embodiments, the mirror, as in the first embodiment, can be made adjustable vertically so as to accommodate students of various heights in respect to the reference point or reference points.

Numerous other variations of the structure of the device of the invention, within the scope of the appended claims will occur to those skilled in the art in the light of the foregoing disclosure. Merely by way of example, the mirror can be replaced by a phosphorescent screen, though the combination of mirror and screen is preferred. The entire golf club head can be made luminous, or a part of the racquet or other implement. Luminous balls may be used. In instructing in "charm" for example, a chair may be provided for the student, with calibrations on the screen and mirror in the form of lines representing desired successive positions of the back and members of the student (and instructor) in sitting and standing. These are merely illustrative.

Having thus described the invention, what is claimed and desired to be secured by Letters Patent is:

1. Apparatus for teaching golf strokes, comprising a playing area the focus of which is a golf ball impact point; a reflective surface adjacent said playing area and positioned to reflect an image of a student in said playing area; calibration marks on said reflective surface so positioned and arranged that the angularity of a golf club held by the student, relative to a reference point on the student, can immediately be observed and determined; a projection screen positioned to be observed by said student within the playing area; calibration marks on said screen in direct correspondence to those on the reflective surface; a projector on the side of the screen away from the said student and arranged to project the image of a teacher on said screen; an elongated calibration mark on the playing area, defining the proper path of the head of the golf club as it is swung through the impact point, and a phosphorescent coating on the playing area in the same location as, but in a broader expanse than, the said elongated calibration mark.

2. Apparatus for teaching tennis strokes comprising a playing area; reference marks on said playing area indicating the standing area of a student; a reflective surface adjacent said playing area and positioned to reflect an image of a student in said playing area; calibration marks on said reflecting surface, said calibration marks being directly related to the proper angularity to be assumed between a racquet held by the student and a reference point on the student in the course of a stroke to be learned; a net positioned between the said reflective surface and the reference marks on the playing area; a projection screen positioned above and at an obtuse angle to the said reflective surface; calibration marks on said screen in direct correspondence to those on the reflective surface; and projector means positioned to project the image of a teacher onto said screen on the side of said screen opposite the playing area.

3. The apparatus of claim 2 wherein the projector means are selectively operable to project images in different areas of said screen.

4. The apparatus of claim 2 including targets on the far side of the net from the student, toward which a ball hit by the student is to be directed to emulate the action of a teacher's image on the screen.

References Cited

UNITED STATES PATENTS

| | | | |
|---|---|---|---|
| 1,383,082 | 6/1921 | Dodds | 35—66 |
| 1,410,811 | 3/1922 | Lewis | 35—29 |
| 2,223,849 | 12/1940 | Fogler et al. | 35—29 X |
| 2,494,000 | 1/1950 | Robertson | 35—29 |
| 3,037,778 | 6/1962 | Chedister et al. | 273—186 |
| 3,070,373 | 12/1962 | Mathews et al. | 273—186 X |
| 3,215,432 | 11/1965 | Lee et al. | 273—29 |

EUGENE R. CAPOZIO, *Primary Examiner.*

H. SKOGGQUIST, *Assistant Examiner.*